United States Patent [19]

Rolfe

[11] 4,198,006
[45] Apr. 15, 1980

[54] MAGNETIC CLEARANCE SENSOR

[75] Inventor: Norman F. Rolfe, Carlisle, Mass.

[73] Assignee: Sperry Corporation, New York, N.Y.

[21] Appl. No.: 955,856

[22] Filed: Oct. 30, 1978

[51] Int. Cl.² .................................................. B02C 25/00
[52] U.S. Cl. ........................................... 241/222; 241/37;
324/208; 340/679
[58] Field of Search ................... 241/37, 222; 340/551,
340/686, 545, 684, 540, 679; 324/207, 208, 228

[56] References Cited

U.S. PATENT DOCUMENTS

| | | | |
|---|---|---|---|
| 2,548,599 | 4/1951 | Garr | 241/37 |
| 2,829,692 | 4/1958 | Innocenti | 241/37 X |
| 3,035,782 | 5/1962 | Burbank | 241/37 X |
| 3,133,707 | 5/1964 | Zimmerman | 241/37 |
| 3,434,670 | 3/1969 | May | 241/37 |
| 3,500,179 | 3/1970 | May | 241/37 X |
| 3,757,501 | 9/1973 | Bennett, Jr. et al. | 340/679 X |
| 3,815,111 | 6/1974 | Abbe | 340/686 |
| 3,855,525 | 12/1974 | Bernin | 324/208 |
| 3,912,434 | 10/1975 | Nagahara et al. | 241/37 X |
| 3,944,146 | 3/1976 | Stockmann et al. | 241/37 X |
| 4,045,738 | 8/1977 | Buzzell | 324/208 X |
| 4,084,752 | 4/1978 | Hagiwara et al. | 241/37 X |

Primary Examiner—Mark Rosenbaum
Attorney, Agent, or Firm—Howard P. Terry

[57] ABSTRACT

Magnetic-electronic apparatus for sensing the clearance between two ferrous metals, for application in measuring the clearance between a shear bar and the cutting knives of a harvesting farm machine, is disclosed having a magnetic sensor disposed within the shear bar for producing a magnetic field, the interception of which by the passage of a knife produces an electronic signal which is processed by appropriate circuitry for indicating the clearance between the knives and the shear bar.

5 Claims, 6 Drawing Figures

MAGNETIC CLEARANCE SENSOR

This invention is an improvement of Applicant's Assignee's copending application, Ser. No. 955,855, filed concurrently herewith.

BACKGROUND OF THE INVENTION

1. Field of the Invention

The invention pertains to farm machinery and, more particularly, to means for detecting the clearance between two proximal ferrous elements in relative motion.

2. Description of the Prior Art

In some machines, the clearance between certain elements in relative motion may greatly affect the operation and efficiency of the machine. For example, in farm machinery, such as a forage harvester, the clearance between the cutter head knives and its associated shear bar may substantially affect the amount of fuel used in the operation thereof and also affect the food quality of the forage therefrom. A forage harvester is a farm machine that picks up crop or forage from the field and chops it into small pieces to enhance the food quality and the storage characteristics thereof. The chopping action takes place in the machine by means of a cutter head, having a plurality of knives mounted on its external perimeter rotating past a fixed shear bar, between which the crop or forage is conveyed. Thus, the clearance between the knives and the shear bar will readily affect the type of cut of the forage, for example, if the clearance between the knives and the shear bar is too large, a bad cut of the crop will occur reducing the food quality of the forage and increasing significantly the energy required. Accordingly, a minimum clearance, preferably as near zero as practical, is preferred. However, due to the fact that both the cutter knives and shear bar wear with use and with sharpening of the knives variations of the clearance of several thousandths of an inch are possible from knife to knife and from one end to the other end of any particular knife. It is apparent, that during operation the clearance of the knives may substantially increase, affecting the operation at its most inopportune time. In order to correct the situation, the operator must stop the operation of the machine, open the housing enclosing the cutter head and shear bar and if desired and practical, the operator may manually measure the clearance, for example, by means of a feeler gauge. This procudure is not only tedious and time consuming, but also inefficient and potentially dangerous. Furthermore, many forage harvesters do not provide easy access for manual measurement with a feeler gauge and, therefore, because of the time required for this procedure, fine tune adjustments of the clearance between the knives and the shear bar are neglected and an average clearance is generally provided for. Such an average clearance is, naturally, far from the optimum.

Accordingly, there is a need to provide efficient and rapid means for determining the clearance between elements in relative motion without requiring manual access thereto and shutdown of the machine and which may be utilized during the actual intended operation of the elements.

SUMMARY OF THE INVENTION

In accordance with the invention, apparatus for sensing the clearance between proximal elements in relative motion is provided and the clearance may be read on a remote, calibrated sensor meter. Furthermore, the apparatus is insensitive to moisture and crop material.

Specifically, the apparatus for sensing the clearance between the proximal elements includes magnetic field generating means cooperating with one of said elements for providing a magnetic field emanating therefrom. The magnetic field is intercepted by the proximal element in relative motion therewith and provides an intercept signal indicative thereof.

In accordance with the invention, circuit means is provided coupled to the magnetic field generating means and responsive thereto. More specifically, the circuit means includes integration means for integrating the intercept signal during the time interval that the intercept signal exceeds preset threshold values, "on" and "off". The integrated signal is proportional to the maximum magnetic flux during the intercept and inversely proportional to the clearance between the proximal elements. The integrated signal is coupled to utilization means such as an appropriately calibrated meter on which the clearance may be indicated.

DESCRIPTION OF THE PREFERRED EMBODIMENTS

Figure 1:
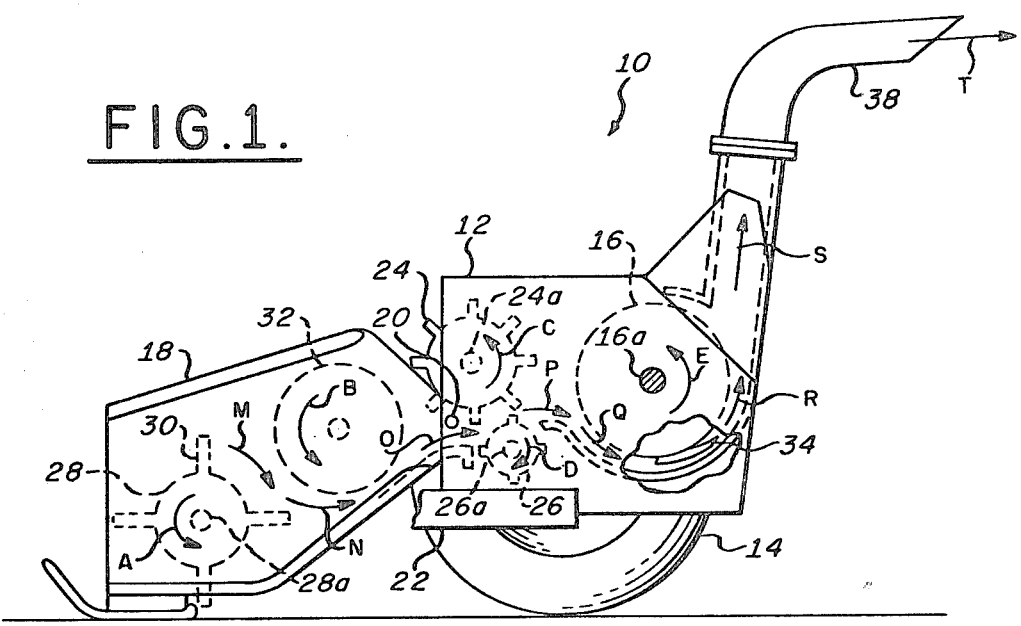
FIG. 1 is a fragmentary elevation view, partly in cross-section, of a forage harvesting machine illustrating one application of this invention.

Attention is directed to FIG. 1 which illustrates a forage harvesting machine 10 in which the present invention may be advantageously utilized. The forage harvester 10 includes a wheel mounted frame or housing 12 mounted on wheels 14 (only one being shown for clarity) for supporting a forage cutter head 16, and in this example, a crop pick up unit 18. The crop pick up unit 18 is pivotally mounted at 20 for support in part from the basic framework 22 by which the harvester may be towed by a suitable tractor (not shown). The harvester further includes at least one set of in-feed conveyor rolls 24 and 26, mounted for rotation about substantially parallel axes 24a and 26a and journalled in the housing 12. The forage cutter head assembly 16 is mounted within the housing 12 to the rear of the conveyor rolls 24 and 26 for rotation on shaft 16a and for receiving forage ejected from the conveyor rolls 24 and 26. A discharge spout 38 extends vertically and then horizontally from the rearward portion of the housing 12.

The crop pick up unit 18 comprises a conventional rotatable reel 28 on a shaft 28a having a plurality of radially projecting, laterally spaced pick up tines or fingers 30. The tines 30 cooperate with a plurality of conventional laterally spaced stripping or doffing members (not shown) to lift the crop into the influence of a conventional rotatable auger 32, which directs the crop material into the input of the in-feed conveyor rolls 24 and 26. From the conveyor rolls 24, 26, the crop material is metered in a mat-like form to the cutter head 16, where it is comminuted by a rotating array of knives 34 attached to the periphery of the cutter head, which cooperate with a fixed shear bar 36, more clearly shown in FIG. 2, and is finally discharged through the discharge spout 38 into a suitable receptacle, such as a truck or wagon (not shown). It is apparent that the forage harvester 10 of FIG. 1 has been simplified for clarity; however, the associated drive belts, other drive means and means for connection thereof to the power source are fully described in U.S. Pat. No. 3,523,411, issued to T. W. Waldrop et al on Aug. 11, 1970 and assigned to the present assignee. When operated in such fashion, the flow of crop material is over the reel 28 into the auger 32, into the rolls 24 and 26, into the cutter head 16 and finally out spout 38. The rotation of the above-mentioned elements is indicated by arcuate arrows A, B, C, D and E and the flow of crop material is indicated by arrows M through T, inclusive.

In traversing path P to Q, the forage material flows between the cutter head 16 or the knives 34 thereof and the shear bar 36 where it is chopped by the rotation of the knives relative to the fixed shear bar into a desired length as determined by, for example, the number of knives and the spacing thereof on the cutter head 16. As indicated above, the clearance between the cutter head knives 34 and the shear bar 36 is desirably zero or as close thereto as is possible to practice efficiently such that a sharp energy efficient cut is obtained, to preserve the food quality of the forage material and to maintain the energy level required to perform the cutting.

Figure 2:
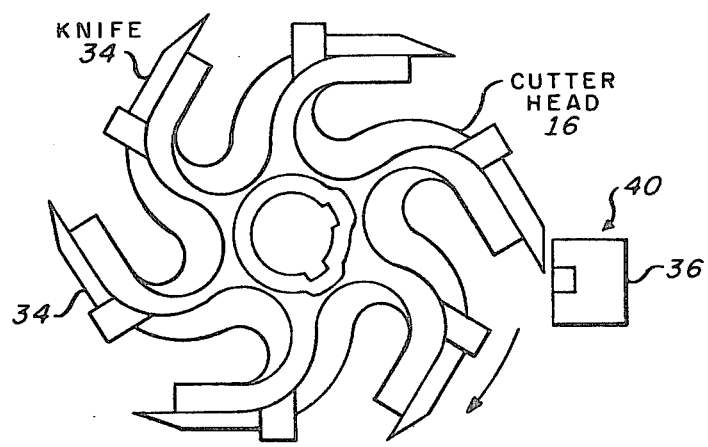
FIG. 2 is a view of the cutter head of the forage harvesting machine of FIG. 1 and the associated shear bar incorporating a magnetic field generating means for utilization with the invention.
Figure 3:
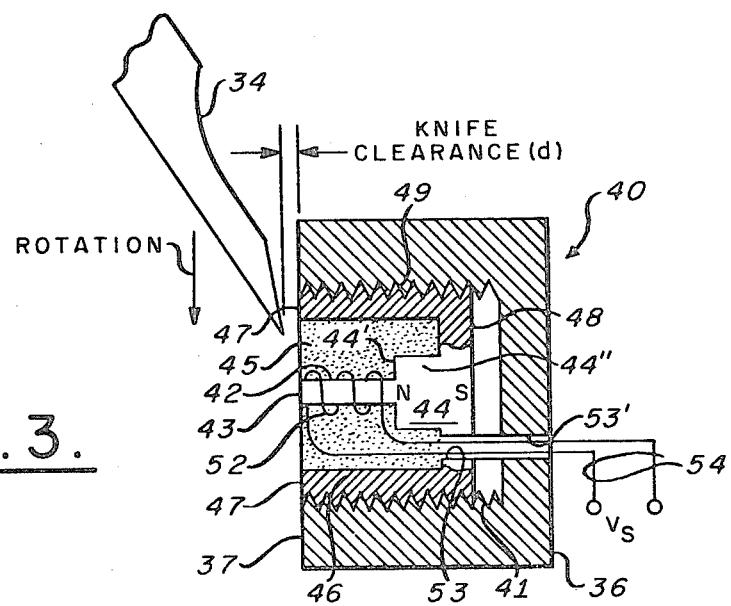
FIG. 3 is a cross-sectional view of a portion of the magnetic field generating means of FIG. 2.
Figure 4:
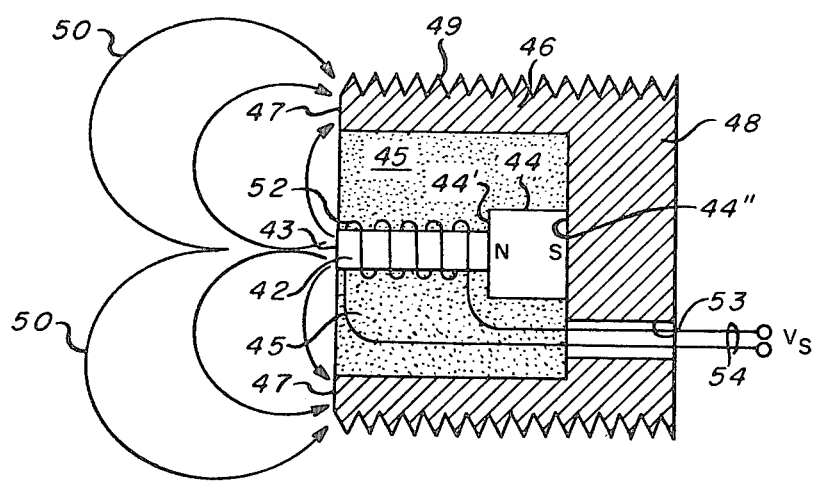
FIG. 4 is an expanded view of a portion of FIG. 3 showing the magnetic field lines associated therewith.

As shown in FIG. 2 and as indicated in Applicant's Assignee's copending application Ser. No. 955,855, a magnetic field generating means or assembly 40 is coupled to and forms a part of the shear bar 36. Although the magnetic generating means 40 may utilize an excitation coil, a permanent magnet is disclosed as it is less expensive and more reliable. Referring now to FIG. 3, the magnetic generating means 40 is disclosed disposed within a cavity 41 of the shear bar 36 for cooperation with the shear bar and forming a face portion 37 thereof in relative motion to the knives 34 of the cutter head 16 between which the knife clearance (d) is measured. As indicated in application Ser. No. 955,855, the preferred embodiment of the magnetic field generating means 40 of FIG. 3 includes a soft iron cylindrical pole piece 42 coupled to one pole (N or S) 44' of a permanent magnet 44. The pole piece 42, moreover, may form a portion of the permanent magnet 44 having a pole (N or S) disposed at the end 43 of the pole piece 42. The pole piece 42 and the permanent magnet 44 are disposed within a soft iron housing 46 having a cup-shaped or annular one end closed formation. The other pole portion 44'' of the magnet 44 is coupled to the internal rear closed end wall 48 of the cup-shaped housing 46. The pole piece 42, disposed within the housing 46 extends outwardly from the rear wall 48 thereof forming an annulus 45, and the end 43 thereof terminates substantially in the plane formed by the peripheral ends or pole 47 of the housing 46, thus forming a part of the face portion 37 of the shear bar 36. The assembly 40 and the shear bar 36 further include means 49 (shown here as matching screw threads) for mounting the assembly 40 within the cavity 41, as shown in FIG. 3. The magnetic field generating means 40 produces magnetic field 50 as shown in FIG. 4, between the pole piece 42 and the pole 47 of the housing 46 which is advantageously used herein. It is noted that in order to prevent material from accumulating in the annulus 45 formed between the pole piece 42 and the housing 46 and, also, to provide structural integrity to the pole piece 42, the cavity may be filled with a non-magnetic filler material.

The magnetic field generating means includes a sensor coil 52 of N turns wrapped about the pole piece 42 having leads 54 extending therefrom. The leads 54 extend through a passageway 53 formed within the housing rear wall 48 and outwardly from the shear bar through a passageway 53' formed therein. The leads are coupled to circuit means 55—FIG. 5 for providing a signal thereto in response to the passage of each of the knives 34 through the magnetic field 50 such that the clearance (d) may be determined. Accordingly, as the knife 34 intercepts the magnetic field 50 of the assembly 40, the magentic flux Φ through the pole piece 42 increases in response to the decreased magnetic reluctance resulting from the presence of the ferrous element, the knife 34. It is known, that the magnetic flux is inversely proportional to some function of distance which increases monotonically as the distance increases; however, for small clearances (d) between the knife 34 and the magnetic generating means 40, the magnetic flux is approximately inversely proportional to the distance, i.e., $$\Phi \alpha 1/d \qquad (1)$$

Furthermore, if the ferrous element or the knife 34 is moved relative to the magnetic generating means 40 and the sensor coil 52, a voltage is sensed by the coil which is expressed as:

$$Vs(t) = N \, d\phi/dt \qquad (2)$$

Figure 5:
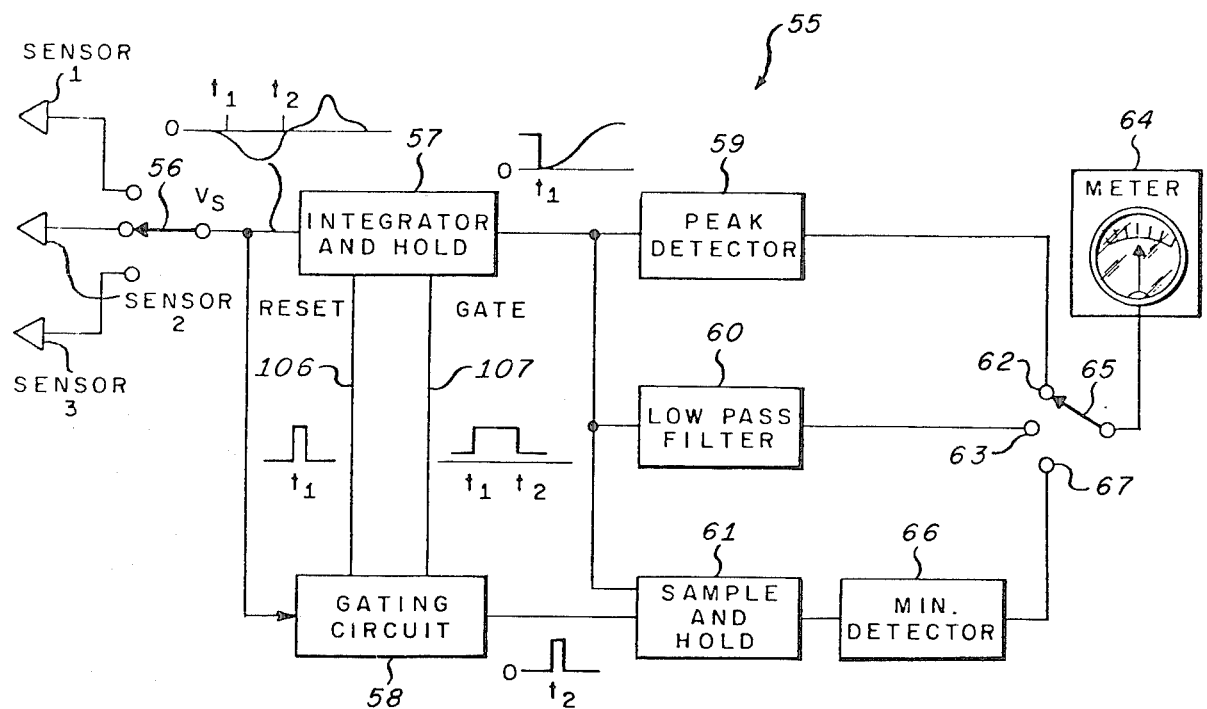
FIG. 5 is a preferred circuit diagram of the invention.

Referring to FIG. 5, the sensed signal is coupled via leads 54 to the circuit 55 of this invention. The circuit 55 is shown to a plurality of the magnetic field generating means assemblies 40 and associated coils 52 disposed in the shear bar 36 as indicated by SENSOR 1, SENSOR 2 and SENSOR 3, although two sensors, located along the shear bar, e.g., approximately one-quarter of the length of the bar from each end, may be preferable. Circuit means 55 is coupled to one of the assemblies 40 and sensor coils 52, i.e., (SENSOR 2) in this example, by means of an appropriate switch 56 such that a signal produced by the movement of the knife 34 through the magnetic field 50 of SENSOR 2 couples a signal Vs to an integrator and holds means 57 and a gating circuit 58. The output of the integrator 57 is coupled to a peak detector 59, a low pass filter 60 and a sample and hold circuit 61. The output of the peak detector 59 and the low pass filter 60 include an associated terminal 62 and 63, respectively, for selectively coupling the respective outputs to a utilization device 64 by means of a switch 65. The utilization device 64 may be a voltmeter appropriately calibrated to measure the clearance (d) in inches, for example. The sample and hold circuit 61 includes an input from the gating circuit 58 and has its output coupled to a minimum value detector 66. The output of the minimum value detector includes an associated terminal 67 for selectively coupling the output thereof to the meter 64 via the switch 65.

Figure 6:
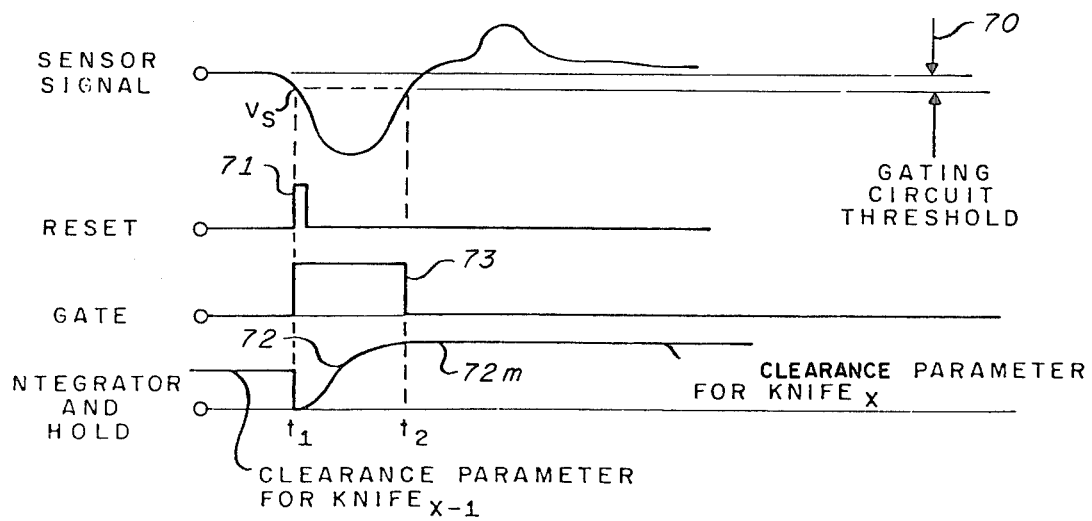
FIG. 6 is a diagram useful in the explanation of FIG. 5.

The operation of the circuit 55 as described herein may be conveniently explained and illustrated by means of the diagrams of FIG. 6. As the knife 34 intercepts the magnetic field, a voltage signal $Vs_x$ is produced, the subscript x indicates the xth knife. As the voltage $Vs_x$ passes through or crosses the gating circuit 55 threshold voltage 70 at time $t_1$, a reset pulse 71 from the gating circuit 58 resets the integrator 57 and starts or gates "on" the integrator and initiates the integration 72. The integration 72 continues until the signal voltage $Vs_x$ again crosses the threshold voltage shown here as the same value as the "on" threshold voltage 70 at time $t_2$, at which point the gating circuit 58 signal 73 stops or gates "off" the integrator 57 which holds the voltage 72 at that integrated value 72 m until the next knife (x+1) intercepts the magnetic field and the operation is repeated. The voltage of the integrator is an integrated signal proportional to the first "half cycle" of the sensor signal $Vs_x$ as shown in FIG. 6, and which is inversely proportional to the clearance (see equation 1).

In order to obtain the clearance of the closest knife, the integrator output voltage 72 m is coupled to the peak detector 59 which senses the peak value of the held waveform, that is, minimum spacing and the clearance output signal thereof is coupled to the appropriately calibrated meter 64 for display. In like manner, the average clearance is obtained by coupling the integrator output voltage to the low pass filter 60, wherein the clearance output signal thereof is displayed on the meter. Furthermore, the farthest knife clearance may be measured by means of the minimum detector 66 coupled to the integrator output through the sample and hold circuit 61. The sample and hold circuit 61 samples the output of the integrator and hold 57 during the hold period. The sampling of the sample and hold 61 is controlled by the gating circuit 58. After each knife passes the shear bar 36, the sample and hold 61 is resampled thus, the output of the sample and hold 61 is a stepped voltage waveform that represents the clearances of each successive knife as it passes the shear bar. The minimum detector 66 detects the minimum value, i.e., the maximum clearance, the clearance output signal thereof is coupled via the switch 65 to the meter 64.

As indicated above, the multiple knives of the cutter head may have different spacings, and each individual knife may have a variation in clearance along the knife which may be readily determined by this invention. Thus, with the above-described preferred embodiment of the invention, it is possible to obtain the clearance of the closest knife, the farthest knife, the average clearance of all the knives, and if more than one sensor is utilized along the shear bar, the variation in clearance along a knife may be determined. In addition, the knife clearance reading provided by the circuit of this invention is independent of the speed or rotation, the number of knives, knife wear and knife geometry, because the integration output voltage, knife clearance, is related to the maximum flux through the pole piece of sensor 40.

Accordingly, the preferred embodiment of the invention may be utilized to obtain accurate clearance settings, for example in a forage harvester cutter head, while the machine is operating in its intended environment under power or when manually operated. Thus, monitoring of the knife clearance of a forage harvester may be readily and efficiently accomplished during actual harvesting by means which obviate the need for access to the knife-shear bar area, and which allow the optimum clearance to be readily updated such that the fuel required for harvesting, cutting, is reduced while the quality of the forage is increased. Further, the apparatus of this invention is insensitive to moisture and crop material. It has been observed that in operation with a forage harvester, the pole piece 42 may be subjected to substantial wear by the action of the forage material such that significant inaccuracies arise in the measurement. Accordingly, a magnetically transparent, wear resistant material, e.g., a stainless steel cover plate, may be disposed across the end 43 of the pole piece, flush with the shear bar, to prevent the wear thereof and the associated inaccuracies.

While the invention has been described in its preferred embodiments, it is to be understood that the words which have been used are words of description rather than limitation and that changes within the purview of the appended claims may be made without departing from the true scope and spirit of the invention in its broader aspects.

I claim:

1. In a circuit for providing a clearance signal proportional to the clearance between opposing portions of proximal ferrous elements in relative motion including magnetic field generating means cooperating with one of said ferrous elements forming a portion thereof and generating a magnetic field emanating from the generating means and outwardly from the opposing portion of said one of said ferrous elements to be intercepted by said other ferrous element for providing an intercept signal, the improvement comprising:
    circuit means cooperating with said field generating means and responsive to said intercept signal,
    said circuit means includes a gating circuit responsive to said intercept signal and having at least one preset threshold, and
    integrator means responsive to said intercept signal and said gating circuit during the time that the intercept signal exceeds the preset threshold for providing an integrated clearance signal related to the maximum flux through the generating means as said other element intercepts said field.

2. In combination with a forage harvester having a cutter head, including a plurality of knives thereon, and a shear bar, apparatus for providing a clearance signal proportional to the clearance between a knife and the shear bar comprising:
    magnetic field generating means cooperating with the shear bar forming a face portion thereof and generating a magnetic field emanating from the generating means and outwardly therefrom to be intercepted by said knife in relative motion with the shear bar for providing an intercept signal,
    circuit means cooperating with said field generating means and responsive to said intercept signal,
    said circuit means includes a gating circuit responsive to said intercept signal and having at least one preset threshold, and
    integrator means responsive to said intercept signal and said gating circuit during the time that the intercept signal exceeds the preset threshold for providing an integrated clearance signal as said knife intercepts said field.

3. In a circuit for providing the clearance signal between opposing portions of proximal elements according to claims 1 or 2 further including peak detector means responsive to said integrated clearance signal for providing a peak integrated signal, which is proportional to minimum clearance.

4. In a circuit for providing a clearance signal proportional to the clearance between opposing portions of proximal elements according to claims 1 or 2 further including low pass filter means responsive to said integrated signal for providing an average clearance signal.

5. In a circuit for providing a clearance signal proportional to the clearance between opposing portions of proximal elements according to claims 1 or 2 further including sampling means responsive to the gating circuit and the integrated clearance signal, and detector means responsive to the minimum integrated clearance signal for providing a maximum clearance signal.

* * * * *